(12) United States Patent
Lee et al.

(10) Patent No.: US 8,725,180 B2
(45) Date of Patent: *May 13, 2014

(54) DISCOVERING AN EVENT USING A PERSONAL PREFERENCE LIST AND PRESENTING MATCHING EVENTS TO A USER ON A DISPLAY

(75) Inventors: Jonathan Lee, Kirkland, WA (US); Igor Borisov Peev, Seattle, WA (US); Jorge Armando Peraza, Seattle, WA (US); Udiyan Padmanabhan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/530,174

(22) Filed: Jun. 22, 2012

(65) Prior Publication Data

US 2012/0258738 A1 Oct. 11, 2012

Related U.S. Application Data

(63) Continuation of application No. 12/163,203, filed on Jun. 27, 2008, now Pat. No. 8,208,905.

(51) Int. Cl.
*H04W 24/00* (2009.01)
*H04W 68/00* (2009.01)
*H04W 68/02* (2009.01)
*H04W 68/04* (2009.01)

(52) U.S. Cl.
CPC .............. *H04W 68/00* (2013.01); *H04W 68/02* (2013.01); *H04W 68/04* (2013.01)
USPC ........ 455/456.3; 455/412; 455/414; 455/403; 455/456.1; 455/456.6

(58) Field of Classification Search
CPC ..... H04W 68/00; H04W 68/02; H04W 68/04; H04W 68/06; H04W 68/08
USPC ............... 715/758, 745; 455/456.3, 412, 414, 455/403, 456.1, 456.6
See application file for complete search history.

(56) References Cited

U.S. PATENT DOCUMENTS

| | | |
|---|---|---|
| 5,613,032 A | 3/1997 | Cruz et al. |
| 6,785,538 B2 | 8/2004 | Nihei |

(Continued)

OTHER PUBLICATIONS

"Pollstar—The Concert Hotwire," (About Pollstar—Frequently Asked Questions), [online], pp. 1-2, http://www.pollstar.com/about_pollstar.pl?page=Help (Publicly known at least as early as Jan. 22, 2008).

(Continued)

*Primary Examiner* — David Q Nguyen
(74) *Attorney, Agent, or Firm* — Kim Sung; Andrew Sanders; Micky Minhas

(57) ABSTRACT

A user profile is used to assist a user in identifying events of interest and to provide context to users regarding events that matches user preferences. The user profile may be based on behaviors exhibited on a mobile device, on input by the user or on data on the mobile device. The user profile is analyzed to provide notification of events of interest to the user based upon the analysis of the user profile. The user profile may include anything that contributes to a state on the device.

17 Claims, 5 Drawing Sheets

(56) References Cited

U.S. PATENT DOCUMENTS

| | | |
|---|---|---|
| 7,174,517 B2 | 2/2007 | Barnett et al. |
| 8,082,511 B2 * | 12/2011 | Sobotka et al. ............... 715/758 |
| 2002/0002705 A1 | 1/2002 | Byrnes et al. |
| 2002/0123924 A1 | 9/2002 | Cruz |
| 2003/0006912 A1 | 1/2003 | Brescia |
| 2006/0184558 A1 | 8/2006 | Martin et al. |
| 2007/0162502 A1 | 7/2007 | Thomas et al. |
| 2007/0239562 A1 | 10/2007 | Lawson |
| 2007/0260989 A1 | 11/2007 | Vakil et al. |
| 2008/0242274 A1 | 10/2008 | Swanburg et al. |
| 2008/0242277 A1 | 10/2008 | Chen et al. |
| 2008/0242317 A1 * | 10/2008 | Abhyanker ............... 455/456.3 |
| 2009/0156182 A1 | 6/2009 | Jenkins et al. |
| 2010/0268685 A1 | 10/2010 | Kawamoto et al. |

OTHER PUBLICATIONS

"JamBase," (JamBase—Go See Live Music), [online], pp. 1-2, http://www.jambase.com/About/FAQ.aspx (Publicly known at least as early as Jan. 22, 2008).

"Metromix Chicago," (About Us), [online], 1 Page, http://chicago.metromix.com/page/about_chicago (Publicly known at least as early as Jan. 22, 2008).

"My Ticketmaster," (Answers—Ask a Question—My Questions), [online], 1 Page, http://ticketmaster.co.uk/h/help.html (Publicly known at least as early as Jan. 22, 2008).

"Ents24.com," (About Ents24—Ents 24 is the UK's biggest guide to live entertainment, with information about thousands of events happening every day), [online], pp. 1-2, http://www.ents24.com/web/content/AboutUs.html (Publicly known at least as early as Jan. 22, 2008).

"BeeThere.net—Free online music concert searcher", posted Mar. 30, 2008, http://www.online-tech-tips.com/fun-stuff/find-local-music-concerts/, printed on Oct. 28, 2010.

\* cited by examiner

DISCOVERING AN EVENT USING A PERSONAL PREFERENCE LIST AND PRESENTING MATCHING EVENTS TO A USER ON A DISPLAY

CROSS REFERENCE TO RELATED APPLICATIONS

The present application is a continuation of application Ser. No. 12/163,203, filed Jun. 27, 2008, entitled "Discovering an Event Using a Personal Preference List and Presenting Matching Events to a User on a Display", which is incorporated herein by reference.

BACKGROUND

Staying current with opportunities to attend the abundance of entertainment and sporting events available today is a challenging task. Currently, if a user wants to attend an event, such as a live music show, the user has to search through a flat listing of events. Such listings may be found on the internet or in local news papers. Most venue listing sites list every band, sporting event, play, etc. that occurs in the user's immediate location for the night the user is interested in attending an event. The user reviews the list of all events for any particular evening, and if the user observes a band or a performer of interest, the user may investigate purchasing tickets to attend the event.

According to one embodiment of the present invention, a user profile for a user of a mobile device is developed, the user profile is transferred to an event aggregator server, the user profile is processed at the event aggregator to identify personalized event results associated with the user profile, the personalized event results are returned to the mobile device of the user and a notification is provided to the user of the mobile device based upon receipt of the personalized event results by the mobile phone.

In many cases, the user may read through the entire list and not see a live event by a performer that they recognize. In such a case, the user has very few options for identifying a live show that night. The user can pick a show at random or else look for a third party or editorial recommendation.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are described for assisting a user in identifying events and providing context to user regarding events that matches user preferences. The user profile may be based on behaviors exhibited on a mobile device, on input by the user or on data on the mobile device. The user profile is analyzed to provide notification of events of interest to the user based upon the analysis of the user profile. The user profile may include anything that contributes to a state on the device. Thus, new applications and experiences are provided for a mobile device.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

According to an embodiment of the present invention, a user profile of a mobile device is developed to provide new applications and experiences on the mobile device. The user profile is used to provide context to user on upcoming events and may be based on behaviors exhibited on a mobile device. To provide notification of events of interest to the user, the user profile is analyzed. The user profile may include anything that contributes to a state on the device.

Figure 1:
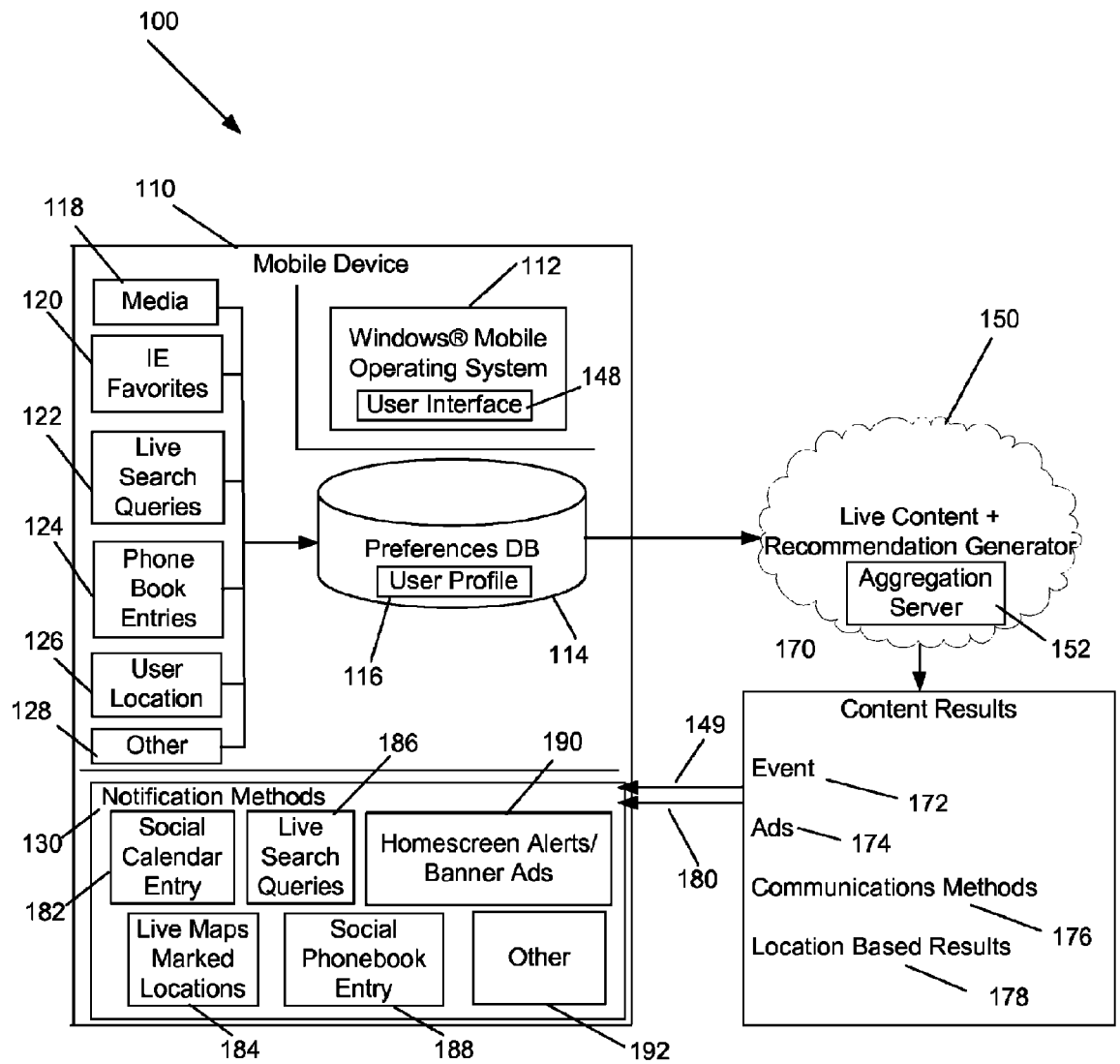
FIG. 1 illustrates a system for providing for discovery of an event of interest in a region using a personal preference list and for presenting notification of events of interest to a user according to an embodiment of the present invention.

FIG. 1 illustrates a system 100 for providing for discovery of an event of interest and for presenting notification of events of interest to a user according to an embodiment of the present invention. In FIG. 1, a mobile device 110 is coupled to a content and recommendation generator 150. The mobile device 110 includes an operating system, such as WINDOWS® mobile operating system 112. A storage device 114 is used to maintain a user profile 116. The user profile 116 may be configured in the form of an XML document. The data of the user profile 116 may be based on user input, search queries made by the user, subscriptions, contacts, the user's primary location, the user's current location, etc. The user's primary location is generally the user's home service area. Accordingly, the user profile 116 includes data obtained from sources, such as media 118, user favorites in an Internet Explorer® browser 120, search queries 122, phone book entries 124, user location 126 and other sources 128. For example, the user profile 116 may include a catalog of artists in the music library of the user.

The user profile 116 may be uploaded to a service provided by a content and recommendation generator 150 that then can take the user profile 116 and make suggestions based upon the data in the user profile 116. For example, if a user profile 116 indicates that a user likes Bob Dylan, the service may suggest to the user that the user may also like Dave Matthews. Other events having some predetermined relationship to data in the user profile 116 may also be suggested. For example, based upon musical tastes identified via the user profile 116, the service provided by a content and recommendation generator 150 may suggest a show or play that appeals to other users that have the same musical tastes. Similarly, if the music of an artist in a user profile 116 is also featured in a movie, the service provided by a content and recommendation generator 150 may suggest that the user might also be interested in the movie.

When developing the user profile 116, the user may be presented with choices. For example, an entry point may be included in the user interface 148 such that if the user looks at all the albums belonging to a particular artist from media 118, then a pivot point may be presented to the user to enable a user to view events or shows associated with that artist. The user may then navigate through a series of steps to set up their profile. Examples includes asking the user whether favorites in the Internet Explorer® browser can be included in the user profile 116, whether the service provided by a content and recommendation generator 150 should determine the user's current location and whether the service provided by a content and recommendation generator 150 can include the user's contacts in the preference database 114 of the mobile device 110. The user interface 148 may be configured to allow the user to check and uncheck a list of items the user wants to include in the user profile 116. The user may also be presented with a choice to see a list of all shows, see a list of only shows from artists in the user's catalog of media 118, see a list of shows from artists that sound like the artists in the user's catalog of media 118, see related movies, see other related art events, etc.

Accordingly, embodiments of the present invention provide a connected entertainment experience on a mobile device 100 involving sharing, discovery and community. The experience centers on connection to, among other items, the user's music library, connection to the user's contacts, connection to community and connection to other devices. To provide a connected entertainment experience, a user interface 148 is provided to walk users through the process. An interface 148 on the mobile device or on a desktop device enables user customization of their mobile device 110 with content that the meets their tastes. A mobile device 110 may also be coupled to a computer (not shown) to customize the preferences of the user. Alternatively, the user may customize the preferences of the user directly from the mobile device 110 without having a desktop relationship.

The content and recommendation generator 150 includes an aggregation server 152 that collects events and then matches the collected events to profiles of registered users. In response, the content and recommendation generator 150 provides content results 170 that include information regarding events of interest. The content results 170 may also be generated by pivoting a list of artist scheduled to perform on a specified date, which was provided by content and recommendation generator 150, to identify any other similar sounding artist. Pivots may also be used to take the user out to see recommended events that are not necessary music, such as films, installations or other live performances. The content results 170 also may include new releases by artist identified by processing the user profile 116. Catalog artists may be matched to artists in a song track or in a cast lists, or by building "who is who" entertainment type relationships. For example, if the user likes a particular artist, a suggestion may be provided to the user to check out a particular actor.

Information regarding events may include specific events 172, targeted advertisements 174, communications 176, location related results 178. For example, targeted advertisements may be presented to a user based upon analysis of the user profile 116. Business communication applications may include suggestions regarding networking opportunities, sales and conferences.

Event related data 180 is returned to the mobile device 110. The event related data 180 may include recommendations, such as upcoming events associated with artists of interest to the user. Recommendations may be based upon matching an event for a specific artist or by identifying similar artist, artist of the same genre, artist using the same rhythm, artist using similar song/composition properties, etc. Similarities may be based on musical properties or may be based on association with purchasing information of the user.

After event related data 180 is returned to the mobile device 110, notification sources 130 of the mobile device 110 provide notification to the user of results provide as a result of analysis of the user profile 116. The notification sources 130 include a social calendar entry 182, mapped marked locations 184, search queries 186, social phonebook entries 188, home screen alerts/banner ads 190 and others 192. The notification sources 130 are populated using the event related data 180. Event information 180 is dynamic so that when the user is in a first city, event information 180 is provided regarding events associated with the first city. When the user lands in a second city, new event information 180 may be immediately provided to change to events associated with the second city. If no relevant data is associated with the location of the user, the service may indicated to the user that an event of interest is taking place in a city that is 100 miles away.

Still further, when the user is traveling, the event information 180 may include a notification to the user that a person in their contact list is currently visiting the same city. Moreover, the event information 180 may suggest an event that both the user and the person in their contact list may be interested in attending while they are both in the same city. Suggestions can even involve a picture that the user takes that is tagged with a GPS coordinate and is later displayed to the user in a relevant situation determined by the system.

The user may also receive notification of an event via SMS messages 149. SMS messages 149 may also be used to provide quick updates on events that the user may want to track, such as sports scores or information about certain companies. The user may also receive updates to certain people in the user's calendar or in the user's contact list.

The event related data 180 may also include suggestions for artist of interest to the user. Thus, rather than pushing down to the user content identifying everything that is happening in New York tonight, a custom set of suggestions are listed for the user so that user can quickly analyze the suggestions. When a similar artist is suggested, the suggestion may also include a context as to why a certain show or artist is recommended. A preview of a similar artist may be offered for review by the user. The event related data 180 may also be associated with a location of a user. However, the location of the user may change. Such a change may be handled automatically using location services, such as GPS, or by entry of user input, such as entry of a city's name or zip code.

Information in the user profile 116 may be updated periodically without any further action on behalf of the user. For example, the user profile 116 may be updated as the user adds music to their mobile device 110. Other user data, such as activities of the user or a new point of interest, may also be used. In addition, applications may be configured to present the event information 180 provided by a service in appropriate or selected locations. For example, new music may be presented on the home screen of the user's mobile device. Moreover, the event information 180 provided by the service may be provided to augment any type of application, e.g., music application, video application, picture application, calendar application, contact application, browser application, or search application. Thus, different event information 180 may be directed to different applications. For example, a coupon for dinner at a particular restaurant may be associated with a contact application so that the next time the user calls the restaurant or is in the vicinity of the restaurant, an alert regarding the coupon is presented to the user. Coupon data may even be provided to the restaurant using the user's mobile device 110 so that user receives the discount automatically. Thus, the user does not have to remember the coupon. Rather, associated information may be disbursed and placed in places where the user will discover the information naturally.

Figure 2:
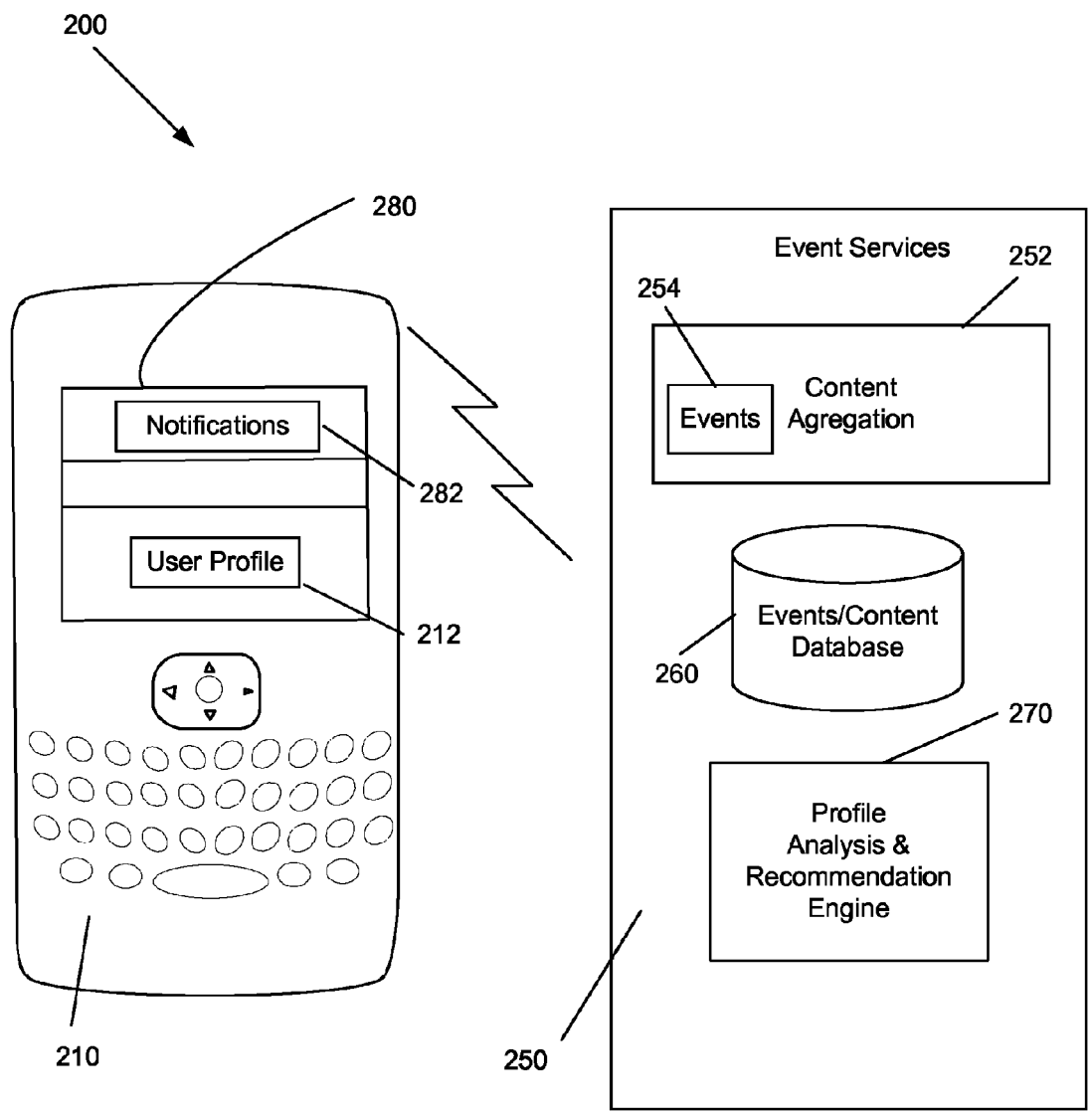
FIG. 2 illustrates events services system according to an embodiment of the present invention.

FIG. 2 illustrates events services system 200 according to an embodiment of the present invention. In FIG. 2, a mobile device 210 communicates with event services 250. In particular, a user profile 212 may be provided to event services 250. Event services 250 include content aggregation 252. Content aggregation 252 obtains information regarding a wide array of events 254. The content aggregation 254 provides the obtained information regarding a wide array of events 254 to a storage device 260. A profile analysis and recommendation engine 270 processes the obtained information regarding a wide array of events 254 maintained in storage device 260.

The profile analysis and recommendation engine 270 forwards to the mobile phone 210 results provided by the processing of the obtained information 254 maintained in storage device 260. Notifications 282 may be presented on the display 280 of mobile device 210. As stated above, the user profile 212 may include anything that contributes to a state on the device. Thus, the notifications 282 may include any type of data relating to the user.

Because the user makes the decisions on what information the user wants to share, the degree of privacy desired by the user is maintained. Once the decisions are made, the information is processed by the profile analysis and recommendation engine 270 to provide suggestions. Data in the user profile 212 may be linked to data of other users to allow correlation with the data of other users. The user may also provide input to the user profile 212 to identify the type of information the user wants to receive as suggestions. Thereafter, the profile analysis and recommendation engine 270 may generate data for populating the user's calendar. Additional data may be provided to the mobile device 210 of the user to allow the user to make queries regarding events associated with an identified artist in the user profile 212. Thus, certain information may already be loaded in the user profile 212 on a mobile device.

Figure 3:
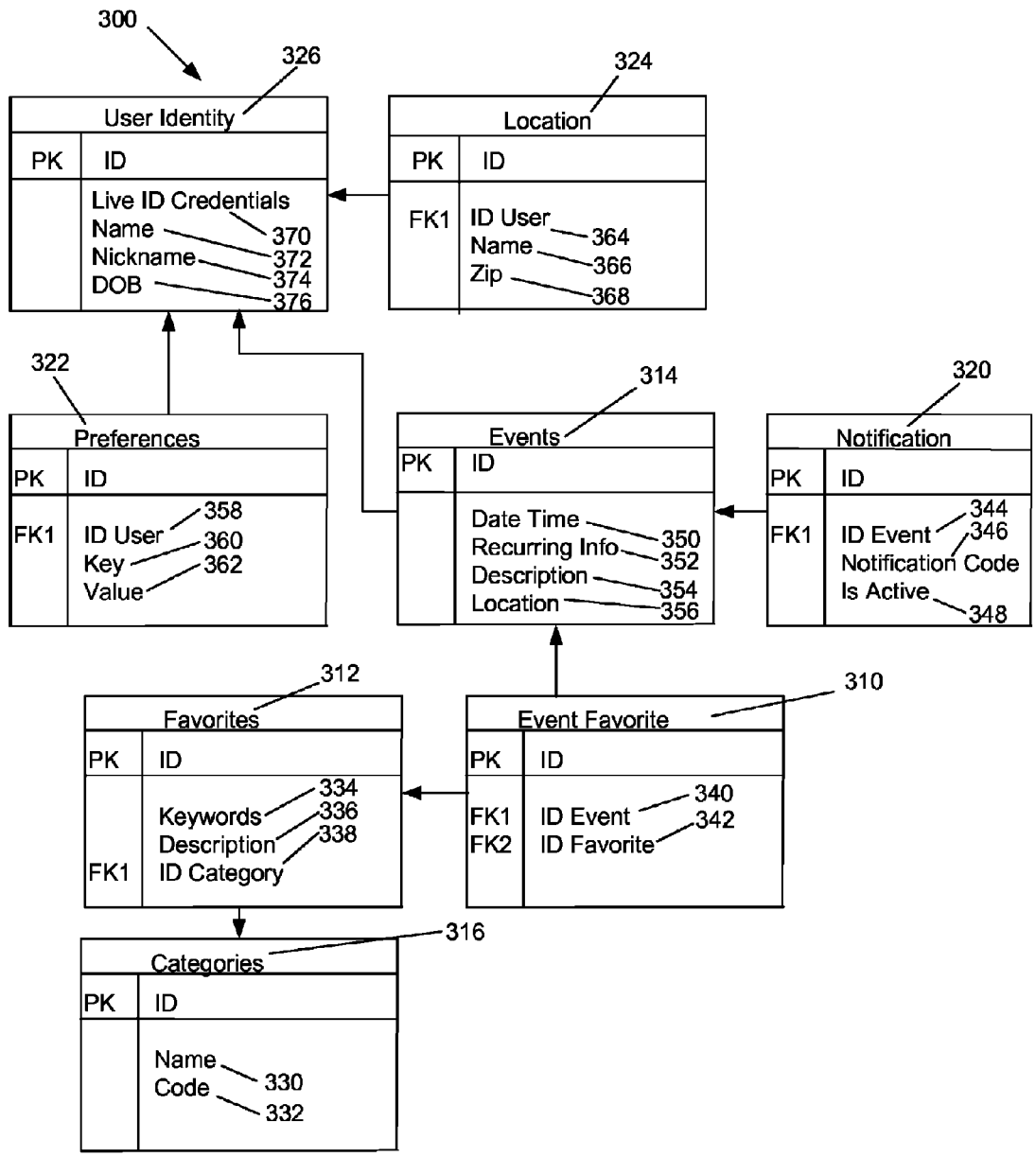
FIG. 3 illustrates a diagram showing relationships between types of data associated with generation of a user profile according to an embodiment of the present invention.

FIG. 3 illustrates a diagram showing relationships between types of data associated with generation of a user profile 300 according to an embodiment of the present invention. In FIG. 3, data from event favorites 310 is used to populate data in favorites 312 and events 314. Data from favorites 312 is used to populate categories 316. Data from notification 320 is also used to populate events 314. Data from preferences 322, location 324 and events 314 populate user identity 326.

Categories 316 include identification of the user names 330 and category codes 332. Favorites 312 include keywords 334, a description of favorites 336 and an identification category 338. Event favorite 310 includes event identifiers 340 and favorite identifiers 342. Notification 320 includes event identifiers 344, notification code 346 and status information 348. Events 314 include data and time 350, information regarding recurrence of events 352, a description of events 354 and event locations 356.

Preferences 322 include a user identifier 358, a key 360 and a user defined value 362. Location 324 includes a user identifier 364, a location name 366 and a location zip code 368. The user identity 326 includes a user's ID credentials 370, the user's name 372, a user nickname 374 and a date of birth 376 of the user.

Those skilled in the art will recognize that embodiments of the present invention are not meant to be limited to the specific examples of relationships between types of data associated with generation of a user profile 300 as illustrated in FIG. 3. Rather, the data and relationships associated with generation of a user profile 300 illustrated in FIG. 3 are provided merely as one embodiment. The data and relationships associated with generation of a user profile 300 may include any data and associated relationship there between used to generate a user profile 300. Moreover, the relationships between types of data associated with generation of a user profile 300 illustrated in FIG. 3 may include any type of data and any corresponding relationships that contributes to a state on the a mobile device.

Figure 4:
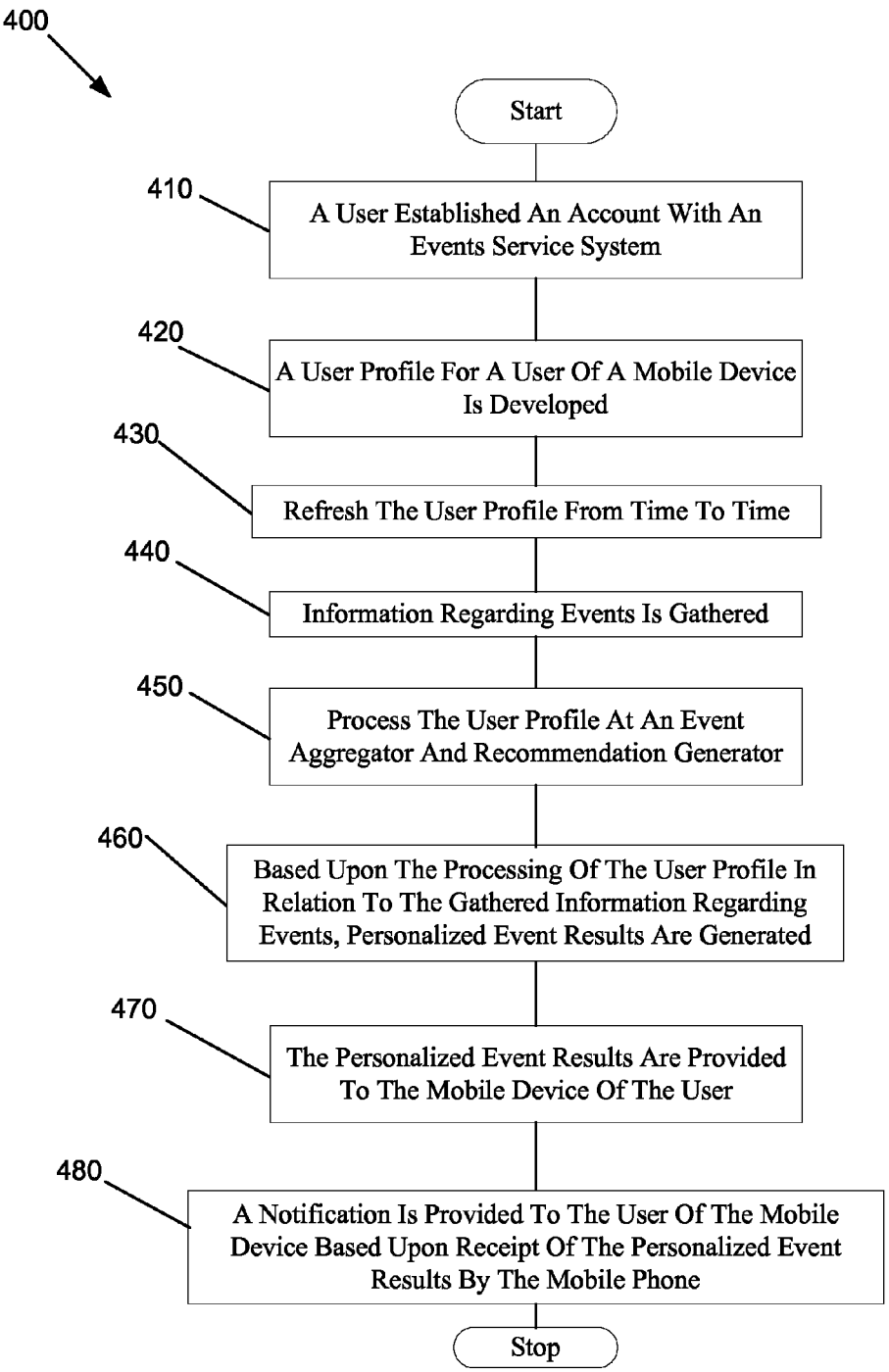
FIG. 4 is a flow chart of a method for providing for discovery of an event of interest in a region using a personal preference list and for presenting notification of events of interest to a user according to an embodiment of the present invention.

FIG. 4 is a flow chart 400 of a method for providing for discovery of an event of interest in a region using a personal preference list and for presenting notification of events of interest to a user according to an embodiment of the present invention. A user established an account with an events service system 410. A user profile for a user of a mobile device is developed 420. The user profile relates to the user and is independent of the mobile device. The user profile may be refreshed from time to time 430. The refreshing of the user profile may be initiated by the user or performed without user action for refreshing the user profile. Information regarding events is gathered 440. The user profile is provided to an event aggregator and recommendation generator for processing 450. Based upon the processing of the user profile in relation to the gathered information regarding events, personalized event results are generated 460. The personalized event results are provided to the mobile device of the user 470. A notification is provided to the user of the mobile device based upon receipt of the personalized event results by the mobile phone 480.

Figure 5:
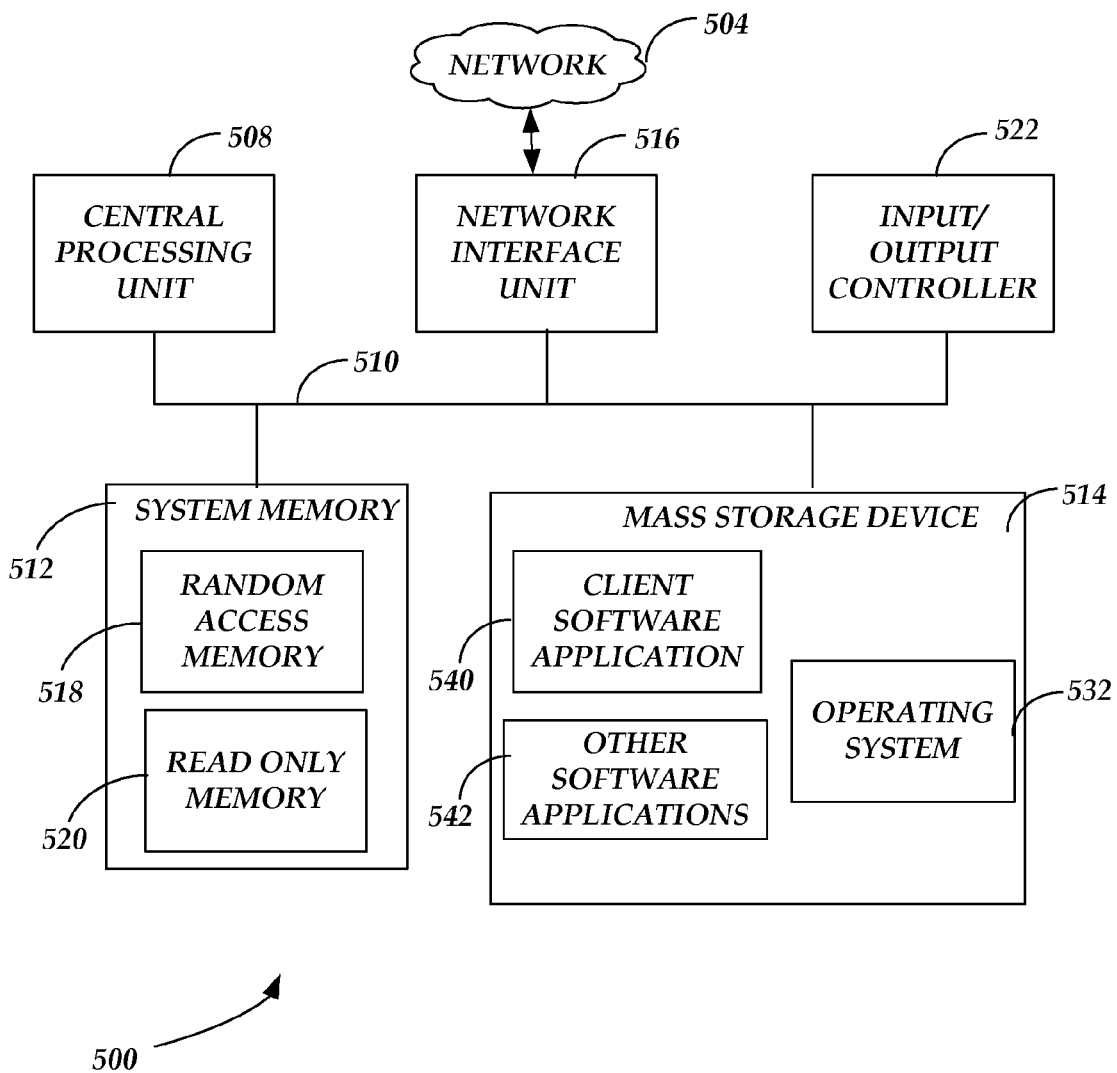
FIG. 5 illustrates an operating environment for embodiments of the invention.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 5 illustrates an operating environment for embodiments of the invention. As shown in FIG. 5, computer 500 comprises a general-purpose desktop, laptop, handheld, or other type of computer capable of executing one or more application programs. The computer 500 includes at least one central processing unit 508 ("CPU"), a system memory 512, including a random access memory 518 ("RAM") and a read-only memory ("ROM") 520, and a system bus 510 that couples the memory to the CPU 508. A basic input/output system containing the basic routines that help to transfer information between elements within the computer, such as during startup, is stored in the ROM 520. The computer 500 further includes a mass storage device 514 for storing an operating system 532, application programs, and other program modules.

The mass storage device 514 is connected to the CPU 508 through a mass storage controller (not shown) connected to the bus 510. The mass storage device 514 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed or utilized by the computer 500.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 500.

According to various embodiments of the invention, the computer 500 may operate in a networked environment using logical connections to remote computers through a network 504, such as a local network, the Internet, etc. for example. The computer 500 may connect to the network 4 through a network interface unit 516 connected to the bus 510. It should be appreciated that the network interface unit 516 may also be utilized to connect to other types of networks and remote computing systems. The computer 500 may also include an input/output controller 522 for receiving and processing input from a number of other devices, including a keyboard, mouse, etc. (not shown). Similarly, an input/output controller 522 may provide output to a display screen, a printer, or other type of output device.

As mentioned briefly above, a number of program modules and data files may be stored in the mass storage device 514 and RAM 518 of the computer 500, including an operating system 532 suitable for controlling the operation of a networked personal computer, such as the WINDOWS® operating systems from Microsoft Corporation of Redmond, Wash. The mass storage device 514 and RAM 518 may also store one or more program modules. In particular, the mass storage device 514 and the RAM 518 may store client application programs 540 and other software applications 542. A computer 500, as illustrated in FIG. 5, may be configured to execute instructions that perform the operations of embodiments of the present invention, and which may be implemented in components of systems 100, 200 as shown in FIGS. 1-2.

It should also be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
using a user profile associated with a user and a location in part to provide context for upcoming events;
refreshing the user profile without receiving a request to refresh the user profile from a mobile device;
identifying location-relevant, personalized upcoming events of interest based on one or more of the user profile and the location; and
providing the location-relevant, personalized upcoming events of interest in part using a personal preference list as part of generating notifications with the mobile device including one or more notifications for event information associated with a first location when in the first location, one or more notifications for event information associated with a second location when in the second location, and one or more notifications when a person in a contact list is at a same location.

2. The method of claim 1 further comprising providing the location-relevant, personalized upcoming events of interest to the mobile device further displaying a notification with the mobile device as part of suggesting an event that may be of interest to the person in the contact list while in a same city.

3. The method of claim 1 further comprising a server system including a content and recommendation generator configured to collect events and match collected events to profiles of registered users.

4. The method of claim 1 further comprising using relationships between types of data associated with generation of the user profile contributing to a device state.

5. The method of claim 1 further comprising discovering a potential event of interest in a region using personal preferences to present notifications using one or more notification sources that include social calendar entries, mapped marked locations, social phonebook entries, screen alerts/banner ads, and others.

6. The method of claim 5 further comprising discovering the potential event of interest using a personal preference list in part to present a notification.

7. The method of claim 1 further comprising using one or more of:
data from event favorites to populate data in favorites and events;
data from favorites to populate categories;
data from a notification to populate personalized upcoming events of interest; and
data from one or more of preferences, location, and events to populate user identity information.

8. The method of claim 7, wherein:
categories include identification of one or more of user names and category codes;
favorites include one or more of keywords, description of favorites, and category;
event favorite includes one or more of event identifiers and favorite identifiers;

notification includes one or more of event identifiers, a notification code, and status information; and events include one or more of date and time information, recurrence information, a description of events, and event locations.

9. The method of claim 1 further comprising using one or more servers and event information to augment types of applications including music applications, video applications, picture applications, calendar applications, contact applications, browser applications, and search applications, wherein different event information is directed to different types of applications.

10. The method of claim 7, wherein:

preferences include one or more of a user identifier, a key, and a user defined value;

location includes one or more of a user identifier, a location name, and a location identifier; and user identity includes one or more of credentials, user name, and user nickname.

11. The method of claim 1 further comprising processing the user profile using an event aggregator to identify the personalized event results.

12. The method of claim 1 further comprising developing user profile information independent of the mobile device.

13. The method of claim 1 further comprising generating personalized event results relevant to an artist of interest to the mobile device.

14. The method of claim 13 further comprising generating the personalized event results relevant to the artist of interest by generating an entertainment experience relevant to the artist of interest.

15. A method comprising:

using at least one processor and memory as part of:

aggregating a plurality of events;

receiving user profile information associated with a user profile;

refreshing the user profile without receiving a request to refresh the user profile from a mobile device;

identifying location-relevant, personalized upcoming events of interest from the plurality of events based in part on location information associated with the profile information; and providing notification of the location-relevant, personalized upcoming events of interest in part using a personal preference list as part of generating notifications with the mobile device including one or more notifications for event information associated with a first location when in the first location, one or more notifications for event information associated with a second location when in the second location, and one or more notifications when a person in a contact list is at a same location.

16. The method of claim 15 further comprising using an event aggregator to identify personalized event results associated with the user profile.

17. The method of claim 15 further comprising identifying location-relevant, personalized upcoming events of interest using user input, search information, subscription information, contact information, a primary location, a current location, or another profile.

* * * * *